Patented Sept. 7, 1943

2,328,729

UNITED STATES PATENT OFFICE 2,328,729

INSULIN PREPARATION

Veader Leonard, Baltimore, Md.

No Drawing. Application May 15, 1940,
Serial No. 335,327

12 Claims. (Cl. 167—75)

This invention relates to new insulin preparations which can be administered in neutral solution, and more particularly to insulin nucleotidates and insulin nucleates and to methods of making the same.

The new preparations are valuable products for use in lowering and controlling the sugar content of the blood, giving an effect which is milder and more prolonged than that of insulin itself.

The new insulin preparations are nucleotidates and nucleates of isulin which can be made by combining insulin with nucleotides, both mononucleotides and polynucleotides, to give insulin mononucleotidates and polynucleotidates and particularly with nucleic acids to form insulin nucleates.

The nucleotides which may be used in making the new insulin nucleotidates include both mononucleotides and polynucleotides, e. g., dinucleotides, trinucleotides, and particularly tetranucleotides such as nucleic acid. Among the mononucleotides may be mentioned adenylic acid, guanylic acid, cytidylic acid, uridylic acid, thymylic acid, inosinic acid and xanthylic acid. The polynucleotides known as nuleic acids are particularly valuable, giving insulin nucleates.

The common nucleic acids are yeast nucleic acid and thymonucleic acid, both of which form valuable insulin nucleates. The nucleic acids may be of either plant or animal origin. Nucleic acids obtained from various plant sources are similar to or identical with yeast nucleic acid, while nucleic acids obtained from various animal sources are similar to or identical with the thymo-nucleic acid obtained from the thymus gland. The term thymo-nucleic acid is used to refer to nucleic acid of animal origin.

The insulin used in forming the new insulin nucleotidates or nucleates is advantageously pure amorphous insulin but other forms of insulin can be used, e. g. crystalline insulin.

I have found that the new insulin nucleotidates and nucleates can be readily prepared by dissolving insulin in acidulated water, dissolving the nucleotide or nucleic acid in dilute alkali, and adding the nucleic acid solution to the insulin solution, or adding the insulin solution to the nucleic acid solution, to give a solution which is neutral or slightly acid or alkaline and from which, by careful addition of acid to decrease the pH of the solution the insulin nucleotidate or nucleate is precipitated as a white precipitate which can be readily separated and washed and dried to give a dry, white product.

Water acidulated with different acids or suitable buffer solutions can be used for dissolving the insulin but I have found water acidulated with hydrochloric acid to make the pH about 2.5 well adapted for use. The nucleotide or nucleic acid can readily be dissolved in dilute alkali such as tenth normal sodium hydroxide or ammonium hydroxide. Instead of using an acidulated aqueous solution of the insulin an acidulated aqueous alcoholic solution may also be used; and instead of an aqueous alkaline solution of nucleic acid an alkaline alcoholic solution may be used.

The proportions of insulin and nucleotide or nucleic acid can be somewhat varied, and products of somewhat different properties obtained. I have obtained insulin nucleates with the use of both a large excess of insulin and a large excess of nucleic acid, ranging, e. g., from two parts by weight of insulin and one of nucleic acid to one of insulin and two of nucleic acid, and have obtained somewhat different products.

While I do not wish to limit myself by any theoretical explanation of the reaction and of the nature of the reaction products, I am led to believe that one molecule of insulin is capable of combining with a considerable number of nucleic acid molecules; and since nucleic acid is a polybasic acid it seems probable that the reaction results in somewhat different salts or compounds when different proportions are used. For example, the product made with a two to one ratio of insulin and yeast nucleic acid appears to be an unsaturated compound in the sense that it contains less combined nucleic acid than a product obtained, for example, with a one to one or one to two ratio of insulin and yeast nucleic acid, where the insulin is apparently saturated in the sense that it is combined with all of the nucleic acid that it is capable of combining with. The products made with an excess of nucleic acid and which appear to be saturated in the sense referred to have in some respects more desirable properties than those made with an excess of insulin.

With the proportions of 2 parts by weight of insulin to 1 part by weight of nucleic acid, all of the nucleic acid appears to combine with the insulin but the insulin is still capable of combining with additional nucleic acid. With equal parts by weight of insulin and nucleic acid all of the insulin appears to combine with the nucleic acid, leaving an excess of nucleic acid uncombined and I have obtained products containing the insulin combined with approximately half as much nucleic acid by weight or somewhat more.

The amounts of acid and alkali used in making the solutions of insulin and nucleic acid are advantageously such that, after admixture, the solution is neutral or slightly alkaline, or, if acid, is only slightly acid and has a pH above that at which the product will precipitate or flocculate. When the resulting solution is above the pH value at which the insulin nucleate will be precipitated, it will remain in solution and it can then be readily separated from the solution by the gradual and careful addition of acid, e. g., of tenth normal hydrochloric acid. As the acid is gradually added and the pH of the solution is reduced there is a resulting turbidity and with further lowering of the pH of the solution there is resulting flocculation or precipitation of the product.

It is important to add sufficient acid to insure precipitation of all of the insulin nucleate. If sufficient acid is not used, and the pH is not reduced to a sufficiently low point, some of the insulin nucleate may remain in solution. If too large an excess of acid is added some of the excess nucleic acid, if present, may be also precipitated.

The progress of the process can readily be followed by pH determinations. At the outset, and after admixing the solutions of insulin and nucleic acid, the solution may be neutral or somewhat alkaline, or may even be slightly acid without precipitation of the insulin nucleate. As the acid is then gradually added, and the pH of the solution is lowered there is first produced a turbidity and with further addition of acid and lowering of the pH the turbidity increases and flocculation or precipitation takes place and when the pH is sufficiently lowered the precipitation of the insulin nucleate is substantially complete. The turbidity point may vary somewhat but with insulin and nucleic acid from yeast the turbidity point is in the neighborhood of pH 5 and the flocculation and precipitation of the insulin nucleate is complete when the pH is reduced to the neighborhood of 3 to 2.

The reaction mixture is advantageously subjected to incubation before separating it from the liquid. Separation can readily be effected, e. g., by centrifugal action.

The invention will be illustrated by the following examples, but it is intended and will be understood that the invention is not limited thereto. The insulin used was pure amorphous insulin, but other forms such as crystalline insulin may be similarly employed. The parts are by weight.

*Example I—Insulin yeast nucleate.*—One part of insulin was dissolved in 100 parts of water acidulated with hydrochloric acid and having a pH of 2.53. One part of yeast nucleic acid was dissolved in 50 parts of tenth normal sodium hydroxide. The nucleic acid solution was gradually aded to the insulin solution with agitation. This resulted in a clear solution of a very pale amber color and showing a pH approximately 10. Tenth normal hydrochloric acid was then slowly added with stirring and a marked permanent turbidity resulted when the pH was about 5.0. Marked flocculation of the precipitate occurred as more acid was added and reached a maximum below pH 3 when additional acid produced no more flocculent precipitate. The precipitate flocculated in large white clumps which sank rapidly to the bottom of the apparatus. The reaction mixture was subjected to incubation for 22 minutes at about 37.5° C. The precipitate was separated in a centrifuge and was washed successively with acid water, absolute alcohol and ether and dried in an incubator at 37.5° C., giving the insulin nucleate in the form of a white product.

*Example II—Insulin yeast nucleate.*—Using tenth normal ammonium hydroxide instead of tenth normal sodium hydroxide with the amounts and materials given in Example I, gave a water-clear solution. On gradually adding tenth normal hydrochloric acid a permanent turbidity appeared with extremely fine flocculation at approximately pH 4 and with the formation of a heavy, flocculent precipitate as the pH was reduced to below pH 3 to the point where additional acid produced no more flocculent precipitate. The product was similarly separated by centrifuging and similarly washed to give the insulin nucleate in the form of a white product.

*Example III—Insulin yeast nucleate.*—Using 1½ parts of yeast nucleic acid in tenth normal ammonium hydroxide, with 1 part of insulin, instead of the one to one proportions of Example II, resulted, on adding the nucleic acid solution to the insulin solution, in a clear, pale amber liquid. On adding tenth normal hydrochloric acid permanent turbidity appeared at a pH of approximately 5 and marked flocculation at a pH below 3. At the point where further addition of acid produced no more flocculent precipitate, the product settled quickly. The product was incubated at 37.5° C. for about one-half hour, then separated by centrifuging, washed with acid water, absolute alcohol and ether and dried in an incubator to give the insulin nucleate in the form of a white product.

*Example IV—Insulin yeast nucleate.*—One part of insulin was dissolved in 100 parts of acid (HCl) water of pH 2.53. Two parts of yeast nucleic acid were dissolved in 50 parts of tenth normal ammonium hydroxide. When the nucleic acid solution was added to the insulin solution a turbidity was produced with a resulting pH of approximately 5. On adding tenth normal ammonium hydroxide to increase the pH to approximately 6 a clear solution of a pale amber color was obtained. On adding tenth normal hydrochloric acid permanent turbidity appeared at a pH of approximately 5, with increasing turbidity and fine flocculation on the addition of more acid until at a point below pH 3, there was sudden marked flocculation with rapid settling out of the product and no more flocculent precipitate produced with additional acid. After incubating for ten minutes at 37.5° C. the precipitate settled out completely and was removed by centrifuging and washed successively with acid water of pH 2.53, absolute alcohol and ether, giving the insulin nucleate in the form of a white product.

*Example V—Insulin thymo-nucleate.*—One part of insulin was dissolved in 100 parts of acid (HCl) water of pH 2.53. One part of thymo-nucleic acid (technical) was dissolved in 50 parts of tenth normal ammonium hydroxide. The addition of the nucleic acid solution to the insulin solution resulted in a clear, pale amber solution of pH of approximately 8. On gradually adding tenth normal hydrochloric acid a permanent turbidity resulted at a pH of approximately 5 and an immediate heavy flocculation occurred, with rapid settling of the product in the form of clumps at a pH somewhat below 4. The product was incubated for about one hour, separated by centrifuging, and washed successively with acid water, absolute alcohol and ether and then dried in the incubator to give the insulin thymo-nucleate as an easily powdered product.

The insulin thymo-nucleate may contain other protein nucleates formed from protein present in the thymo-nucleic acid, if the acid is not free from such constituents.

*Example VI—Insulin thymo-nucleate.*—Using 1½ parts of thymo-nucleic acid instead of 1 part, as in Example V, and with the procedure otherwise the same, a clear, pale amber solution was obtained on adding the nucleic acid solution to the insulin solution having a pH of approximately 9. The turbidity point was reached at a pH of approximately 5 and a heavy, fluocculent precipitate was formed which settled rapidly in the form of large clumps at a pH somewhat below 4. After incubating for about twenty minutes at 37.5° C. the product was separated by centrifuging and washed and dried as previously described.

*Example VII.*—Using 2 parts of thymo-nucleic acid to 1 part of insulin, instead of the one to one ratio of Example V, resulted in a clear, pale amber solution of approximate pH 9 when the nucleic acid solution was added to the insulin solution. Permanent turbidity appeared at a pH of approximately 5.0 and heavy flocculation with rapid settling occured when the pH was reduced to a point somewhat below pH 4. The product was incubated for half an hour at 37.5° C. and separated by centrifuging and washed and dried as above described.

As in the case of insulin nucleate made from yeast nucleic acid, the yeast thymo-nucleate can similarly be made by dissolving the thymo-nucleic acid in other alkalies than ammonium hydroxide, e. g., in tenth normal sodium hydroxide, and the process carried out in a similar manner to that described in Examples V, VI and VII.

In the foregoing examples the insulin used was the pure amorphous insulin. Insulin nucleates and nucleotidates can also be prepared from insulin in other forms, e. g., crystalline insulin. I have used a commercial aqueous concentrate of insulin and obtained a product which contained besides insulin nucleate other protein nucleate formed from the protein present in the concentrate.

Other insulin nucleotidates can be prepared in a similar manner to that described in the foregoing examples, starting with other nucleotides. Insulin mononucleotidates can be prepared from insulin and mononucleotides. For example, insulin guanylate can be produced from insulin and guanylic acid in the form of a white product. This product is soluble in strongly acid water and cannot therefore be washed with such acid water as in the case of insulin nucleate. It was washed with absolute alcohol and dried to give a white product. Insulin adenylate can be similarly prepared from insulin and adenylic acid in the form of a white product. This product is also soluble in strongly acid water and was washed with alcohol before drying.

In a similar manner other insulin nucleotidates can be prepared from other mononucleotides as well as from dinucleotides, trinucleotides, etc.

The new insulin nucleotidates and nucleates are readily soluble in dilute alkali, e. g., in tenth normal sodium hydroxide and on neutralization either with a dilute acid or with a suitable buffer solution they remain in solution so that they can be utilized for administration in neutral or faintly alkaline solutions. The pH of these solutions can be adjusted to that of the body fluids before administration.

The new products can be assayed for dosage in the same manner as is commonly used in standardizing commercial insulin products. The new insulin preparations show the characteristic insulin effects when their solutions are administered subcutaneously to rabbits, namely, prompt reduction of the blood sugar, characteristic convulsive seizures when the blood sugar reaches the neighborhood of 45 mg. per 100 cc. of blood, and prompt relief of all symptoms and permanent recovery on the administration of glucose, either intravenously or subcutaneously, with return of the blood sugar to normal levels.

It is one of the advantages of the new insulin nucleotidates and nucleates that they can be used in neutral solution, which solutions can readily be prepared by dissolving in weak alkali and titrating back to neutrality and using the resulting solution for injection. Another advantage is that the physiological effect is less violent and more prolonged than that obtained with pure insulin, giving a smooth, gentle and sustained lowering of the blood sugar.

The new insulin nucleates are further distinguished by their resistance to peptic and tryptic digestion, being markedly different in this respect from insulin itself.

I claim:
1. An insulin nucleotidate.
2. An insulin nucleate.
3. An insulin mononucleotidate.
4. An insulin polynucleotidate.
5. Insulin nucleate from insulin and yeast nucleic acid.
6. Insulin thymo-nucleate.
7. The method of making an insulin nucleotidate which comprises reacting a solution of insulin with a solution of a nucleotide.
8. The method of making insulin nucleotidates which comprises admixing a dilute acid solution of insulin with a dilute alkaline solution of a nucleotide to form a solution of the insulin nucleotidate and precipitating the same from the solution by the addition of acid.
9. The method of making an insulin nucleate which comprises admixing a solution of a nucleic acid in dilute alkali with a solution of insulin in dilute acid and precipitating the product from the solution by the addition of acid.
10. The method of making insulin yeast nucleate which comprises dissolving the nucleic acid in dilute alkali, admixing the solution with a solution of insulin in dilute acid, and precipitating the insulin yeast nucleate from the solution by the addition of acid.
11. A composition suitable for injection comprising a substantially neutral aqueous solution of an insulin nucleotidate.
12. A composition suitable for injection comprising a substantially neutral aqueous solution of an insulin nucleate.

VEADER LEONARD.